United States Patent [19]

Dunfield

[11] Patent Number: 5,524,985
[45] Date of Patent: Jun. 11, 1996

[54] FLUID THERMAL COMPENSATION AND CONTAINMENT FOR HYDRODYNAMIC BEARINGS

[75] Inventor: John C. Dunfield, Santa Cruz, Calif.

[73] Assignee: Seagate Technology, Inc., Scotts Valley, Calif.

[21] Appl. No.: 408,266

[22] Filed: Mar. 21, 1995

[51] Int. Cl.⁶ .................... F16C 32/06; F16C 17/22
[52] U.S. Cl. ................. 384/107; 384/100; 384/278; 384/905
[58] Field of Search .................... 384/100, 107, 384/111, 112, 113, 114, 118, 120, 133, 278, 905

[56] References Cited

U.S. PATENT DOCUMENTS

| | | | |
|---|---|---|---|
| 2,901,300 | 8/1959 | Burr | 384/278 |
| 4,630,943 | 12/1986 | Stahl et al. | 384/133 |
| 5,127,744 | 7/1992 | White et al. | 384/112 |

*Primary Examiner*—Thomas R. Hannon
*Attorney, Agent, or Firm*—Flehr, Hohbach, Test, Albritton & Herbert

[57] ABSTRACT

A combination of a fixed and moving surface, which may in a common example comprise a rotating journal facing a thrust plate, characterized in that both parts are made of materials or material combinations chosen such that, as the temperature rises, the gap between the bearing surfaces becomes smaller due to the different thermal expansion of the relevant parts.

The high coefficient expansion material includes a relatively shallow recess near the center of the bearing. This recess allows the expansion material to expand with temperature in order to decrease the gap and maintain the stiffness of the bearing. As the temperature rises, the fluid is forced out of the recess region and into the effective bearing gap thereby maintaining the overall stiffness of the bearing, which would otherwise fall as fluid viscosity drops.

In an alternative construction, one of the surfaces that is subject to relative axial rotation is designed to incorporate a sequence of materials along the axial length of the bearing such that an effective magnetic circuit is set up axially along the bearing. The lubricating fluid is a ferro fluid confined and effectively positioned in the bearing gap by the magnetic circuit.

21 Claims, 3 Drawing Sheets

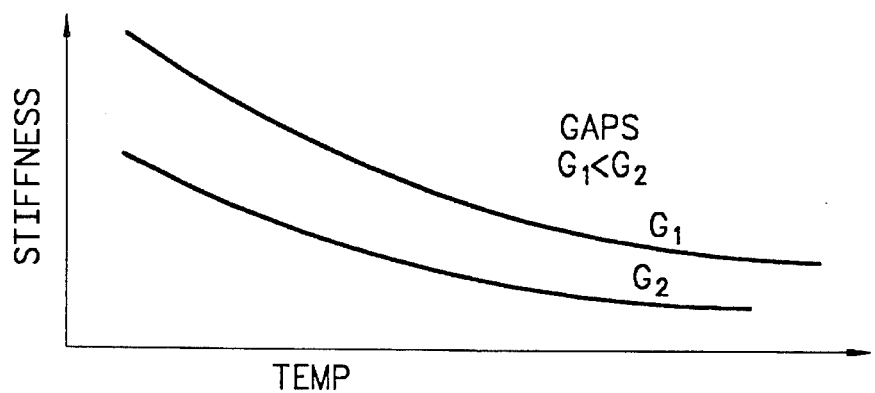
FIG. 3
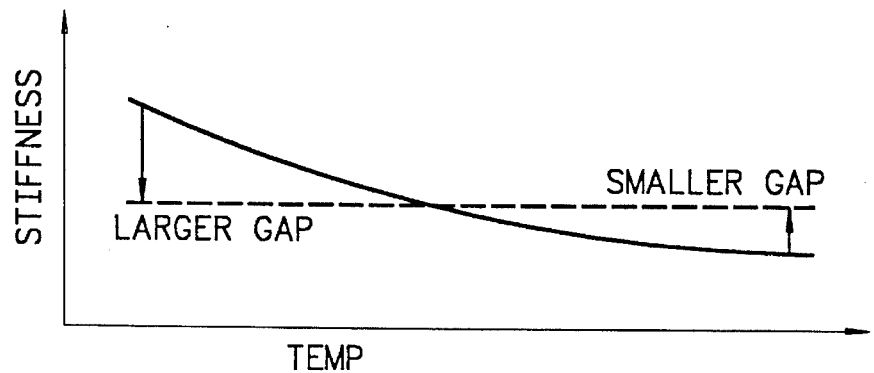
FIG. 4
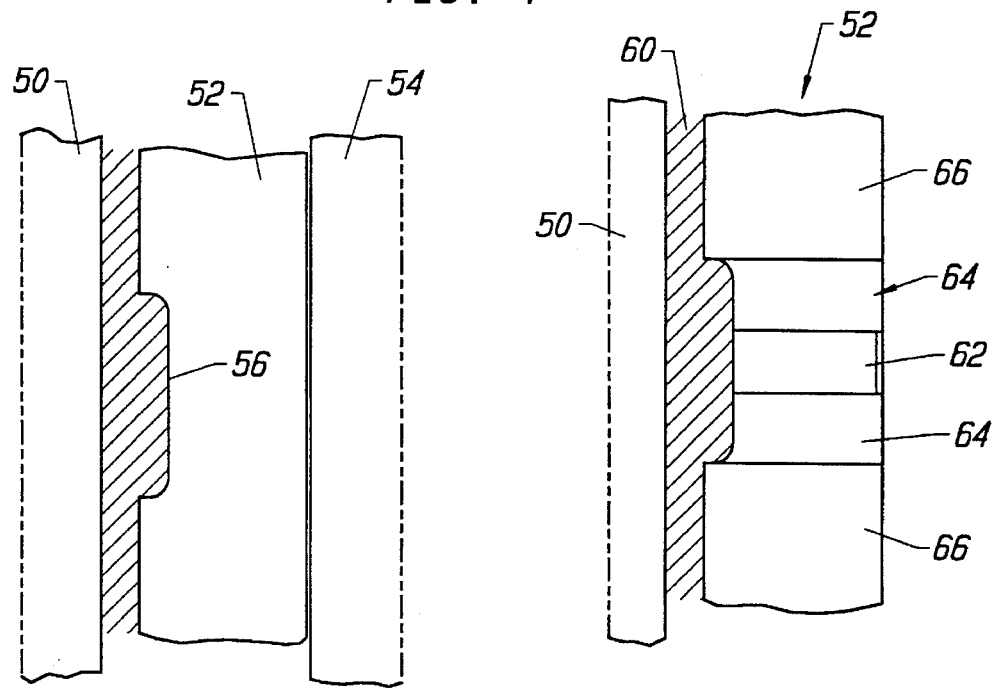
FIG. 5
FIG. 6

FLUID THERMAL COMPENSATION AND CONTAINMENT FOR HYDRODYNAMIC BEARINGS

FIELD OF THE INVENTION

The present invention is a type of hydrodynamic bearing that provides support and rotation for a high speed spindle element in a computer disc drive system.

BACKGROUND OF THE INVENTION

Disc drive memory systems have been used in computers for many years as storage space for digital information. Information is recorded on concentric memory tracks of magnetic discs that rotate around a spindle. Information is accessed by read/write heads located on a pivoting arm which moves radially over the surface of the disc. The read/write heads—transducers—must be accurately aligned with the storage tracks on the disc to ensure proper reading and writing of information.

The discs are rotated at high speeds in an enclosed housing by means of an electric motor located inside the hub or below the discs. One type of motor in common use is known as an in-hub or in-spindle motor. Such in-spindle motors typically have a spindle mounted by means of two ball bearing systems to a motor shaft in the hub. One of the bearings is located near the top of the spindle and the other near the bottom. These bearings allow for rotational movement between the shaft and the hub while maintaining accurate alignment of the spindle and the shaft. The bearings are normally lubricated by grease or oil.

The conventional bearing system described above is prone, however, to several shortcomings. First, vibration is generated by the balls rolling on the raceways. Ball bearings used in hard disk drive spindles run under conditions that often cause physical contact between raceways and balls in spite of the lubrication layer provided by the bearing oil or grease. Hence, ball bearings running on the apparently even and smooth, but microscopically uneven and rough, raceways transmit surface and circular imperfections in the form of vibration to the rotating disk. This vibration results in misalignment between the data tracks and the read/write transducer. These imperfections thus limit data track density and the overall performance of the disc drive system, as well as limiting the lifetime of the disc drive.

Another problem is related to the use of hard disk drives in portable computer equipment and the resulting requirements in shock resistance. Shocks create relative acceleration between the disks and the drive casting. Since the contact surface in ball bearings is very small, the resulting contact pressures may exceed the yield strength of the bearing material and leave permanent deformation and damage on raceways and balls.

Moreover, mechanical bearings are not always scaleable to smaller dimensions. This is a significant drawback since the tendency in the disc drive industry has been to continually shrink the physical dimensions of the disc drive unit.

Another problem is that of potential leakage of grease or oil into the atmosphere of the disc drive, or outgassing of the components into this atmosphere. Because of the extremely high tolerance for smaller spaces between tracks on the disc and the gap in the transducer which is used to read and write data on the disc, discs are located within sealed housings in which contaminants cannot be tolerated.

Another problem is the friction that is generated on the ball bearing surface. Since ball bearings are always in mechanical or physical contact with the lubricating layer of grease or the motor shaft, resulting friction limits the maximum possible speed of rotation for acceptably long life. This limitation conflicts with the need to spin the magnetic disc at ever higher speeds in order to improve the overall performance of the disc drive. Moreover, such conventional spindle motors are prone to spindle bearing motion or run-out. As a result of such run-out, the disc that is rigidly mounted to the rotating spindle may tilt or wobble, especially when assaulted by the shocks which are inherently imposed on the small disc drives utilized in portable computer systems. Since such bearings have a non-repeatable runout, a limit on track pitch or TPI is imposed.

As an alternative to conventional ball bearing spindle systems, researchers have worked on developing a hydrodynamic bearing. In these types of systems, lubricating fluid (gas or liquid) functions as the bearing surface between a stationary base housing and the rotating spindle/hub. For example, liquid lubricants including oil, more complex ferro-magnetic fluids, or even air have been utilized in hydrodynamic bearing systems. Air is popular because it is important to avoid the outgassing of contaminants into the sealed area of the head disc housing. However, air cannot provide the lubricating qualities of oil or the load capacity. Its low viscosity requires smaller bearing gaps and therefore higher tolerance standards to achieve similar dynamic performance. Thus an air bearing with adequate stiffness becomes expensive for most operating speeds of less than 6000 rpm.

The liquid lubricant must be sealed within the bearing to avoid a loss which would result in reduced bearing load capacity and life. Otherwise, the physical surfaces of the spindle and of the housing would come into contact with one another leading to accelerated wear and eventual failure of the bearing system. Equally serious, the failure of such a seal or other effort to contain the lubricant within the bearing system would allow contaminants entry into the head disc region of the disc drive.

In the prior art, seals for containing the fluid within the disc drive utilize a pressurized film on the surface of the liquid air interface, or capillary action. In the case of bearing assemblies which employ ferro-magnetic fluids, the seal is achieved by means of a magnetic field established at each end of the bearing.

Other obvious shortcomings of known hydrodynamic bearings include the fact that many prior art hydrodynamic bearing assemblies require large or bulky structural elements for supporting the axial and radial loads, as such hydrodynamic bearings do not have the inherent stiffness of mechanical bearing assemblies. It is difficult to scale the structural support elements to fit within the smaller disc drive dimensions currently in demand. In other instances, hydrodynamic bearing assemblies require extremely tight clearances and precise alignments. This burden makes it difficult to manufacture such assemblies since even a small deviation or aberration can lead to faulty bearings.

A combination of a magnetic bearing and a hydrodynamic bearing has been proposed. This would potentially solve a start torque and possible contamination/particle count issue that could otherwise develop when the hydrodynamic bearing is at rest. Contact between the stationary and rotating members is constant until the spinning portion develops enough pressure to lift off and stop rubbing. The magnetic bearing provides a centering force so that contact of parts does not occur at rest and there is no rubbing. However, use of such a combination of bearings adds complexities to the design of a hydrodynamic bearing.

As mentioned previously, the stiffness of the hydrodynamic bearing is also a major issue. The stiffer the bearing, the higher the natural frequencies in the radial and axial directions, and the track on which reading and writing occurs is more stable. Therefore, it is advantageous to use a fluid or grease which has a viscosity significantly greater than air. However, it is also true that this fluid must be contained so that it does not contaminate the drive, and the running torque for drag is increased with the fluid, but damping of motion occurs. This damping of motion must be balanced against the fact that the fluid viscosity is temperature dependent and so stiffness, damping and drag are functions of temperature. These functions can vary by an order of magnitude over the expected temperature range of interest —5° C. to 70° C.—following the known phenomenon that viscosity is reduced as temperature is elevated.

Thus the stiffness of a bearing having a defined gap and its ability to support a load or accurately support a disc rotating on a spindle without wobble or tilt will be decreased as the temperature of the fluid in the hydrodynamic bearing is increased.

SUMMARY OF THE INVENTION

To provide a hydrodynamic bearing which is simple and scaleable in design and is also reliable when exposed to a wide range of temperatures.

A further objective or purpose of the present invention is to provide a hydrodynamic bearing in which the design compensates for a change in the viscosity of the fluid or oil that lubricates the hydrodynamic bearing as a result of a change in temperature.

A related objective of the present invention is to provide the afore-mentioned temperature compensation while minimizing the possibility of particles or droplets of lubricating fluid leaving the gap region.

Thus a further objective of the present invention is to provide a hydrodynamic bearing, which is especially useful in a spindle motor, in an information storage disc unit. The disc will rotate with stability over wide temperature ranges while utilizing a hydrodynamic bearing, minimizing the possibility of the loss of particles or droplets of the lubricating fluid into the disc drive atmosphere.

In summary, the present invention utilizes a combination of a fixed and moving surface, which may in a common example comprise a rotating journal facing a sleeve or a thrust plate facing a fixed surface, the bearing system in accordance with the invention is characterized in that both parts are made of materials or material combinations chosen such that, as the temperature rises, the gap between the bearing surfaces becomes smaller due to the different thermal expansion of the relevant parts. The utility of the present invention is not limited to hydrodynamic bearings of a particular type such as journal or thrust plate.

By constructing the bearing system in the described manner, as the temperature increases, the bearing gap becomes smaller instead of larger. This offers the advantage that in a cold condition the bearing gap may be comparatively large, so that the friction torque is small, at the operating temperature the viscosity of the lubricant increases, but the bearing gap also decreases, so that a high permissible load and stability are obtained.

In a bearing system in accordance with the invention which comprises two relatively rotatable parts which at least have two bearing surfaces that cooperate with one another in the radial direction, is characterized in that both parts are made of metal, at least one of the two operating bearing surfaces being provided with a surface layer of a synthetic material having a thermal expansion coefficient which is higher and a modulus of elasticity which is smaller than that of the metal of the relevant part.

In this embodiment, the layer of synthetic material will expand more in reaction to a temperate rise in the metal of the part it is connected. Because the synthetic material can expand only in the direction of the bearing gap, this gap will be reduced.

The high coefficient expansion material includes a relatively shallow recess near the center of the bearing. This recess allows the expansion material to expand with temperature in order to decrease the gap and maintain the stiffness of the bearing. As the temperature rises, the fluid is forced out of the recess region and into the effective bearing gap thereby maintaining the overall stiffness of the bearing, which would otherwise fall as fluid viscosity drops.

In an alternative construction, one of the surfaces that is subject to relative axial rotation is designed to incorporate a sequence of materials along the axial length of the bearing such that an effective magnetic circuit is set up axially along the bearing. The lubricating fluid is a ferro fluid confined and effectively positioned in the bearing gap by the magnetic circuit. One of the materials along the axial length of the bearing is designed to change in permeability with temperature, thus altering the direction and strength of the magnetic field and along the bearing gap. This causes a shift in the effective location of the fluid. The fluid shift maintains fluid and moves fluid more positively into the bearing gap at elevated temperatures compensates for the reduced viscosity of the lubricating fluid, thus maintaining the stiffness of the bearing.

Further, the above embodiments are not limited to being useful with hydrodynamic bearings where one surface having grooved surfaces. The invention is also useful in other types of hydrodynamic bearings where the thrust plate surface controls variations in pressure by variations in surface roughness.

Other features and advantages of the invention will be apparent to a person who's skilled in the art and studies the following detailed description of a preferred embodiment given in conjunction with the accompanying drawings. It should be apparent that while the preferred embodiment is to be discussed in conjunction with its use in an information storage disc, other uses for this motor will be found by persons of skill in the art where the stiffness requirement and usefulness of the motor over wide ranges of temperature are significant. Therefore the utility of the bearing and motor designs are not limited to the field of information storage disc systems.

BRIEF DESCRIPTION OF THE DRAWINGS

FIG. 3 is a graph of the relationship between stiffness and temperature in a hydrodynamic bearing;

FIG. 4 shows the variation in stiffness with temperature for an uncompensated and for a temperature compensated bearing;

FIG. 5 is a vertical sectional view of a first embodiment of a temperature compensated hydrodynamic bearing in accordance with the invention;

and FIG. 6 is a vertical sectional view of a second embodiment of a temperature compensated hydrodynamic bearing in accordance with the invention.

DETAILED DESCRIPTION OF A PREFERRED EMBODIMENT

The improved hydrodynamic bearing described includes temperature compensation such that the bearing retains its stiffness even over a wide range of temperatures. A hydrodynamic bearing of this type is especially useful in information storage disc applications because stiffness prevents the disc from tilting or wobbling during rotation which could cause off tracking, miss tracking or extended sequence times. It is thus desirable to force as much fluid as possible into the gap to maintain this stiffness. It especially useful in such products because if the fluid is confined to the region where it lubricates the rotating surfaces of the bearing, it cannot migrate toward the regions where the data storing discs are located and thus prevents contamination of these disks.

Figure 1:
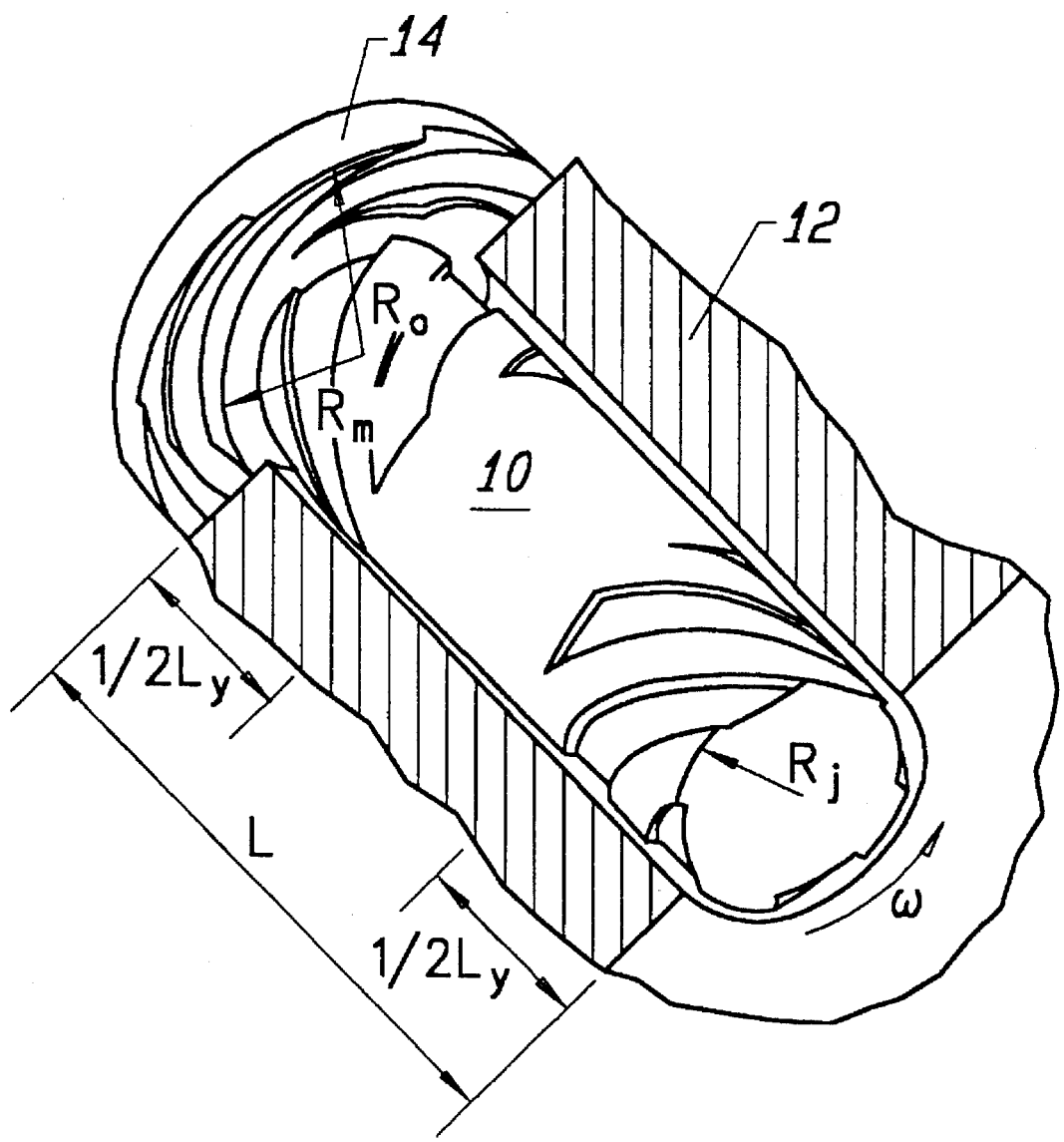
FIG. 1 is an illustrative embodiment showing the basic principles of operation of a hydrodynamic bearing.

The basic principle of the present invention is based on a hydrodynamic bearing as already known and a simple example which is shown in FIG. 1. As shown, a shaft 10 rotating inside a bushing 12 forms the journal bearing, with one of the opposing two surfaces (in this case the shaft) carrying cylindrical sections of spiral grooves. A thrust plate 14 may also be provided with concentric spiral groove sections, although this is not essential to the present invention. The rotation of the shaft churns and pumps the fluid as a function of the direction of the groove's angle with respect to the shaft's sense of rotation. The pumping action builds up multiple pressure zones along the journal and the thrust plate maintaining a fluid film between the rotating parts so that the parts rotate freely past one another and provide the required stiffness for the bearing. Obviously, changes in the operating temperature and the environment of the fluid can change the gap and thus effect the stiffness of the bearing. Further, the rotation and pumping of the fluid increases the chance of some of the fluid exiting the end of the bearing, an opportunity which is enhanced by the increase in volume of the fluid with changes in temperature.

Figure 2:
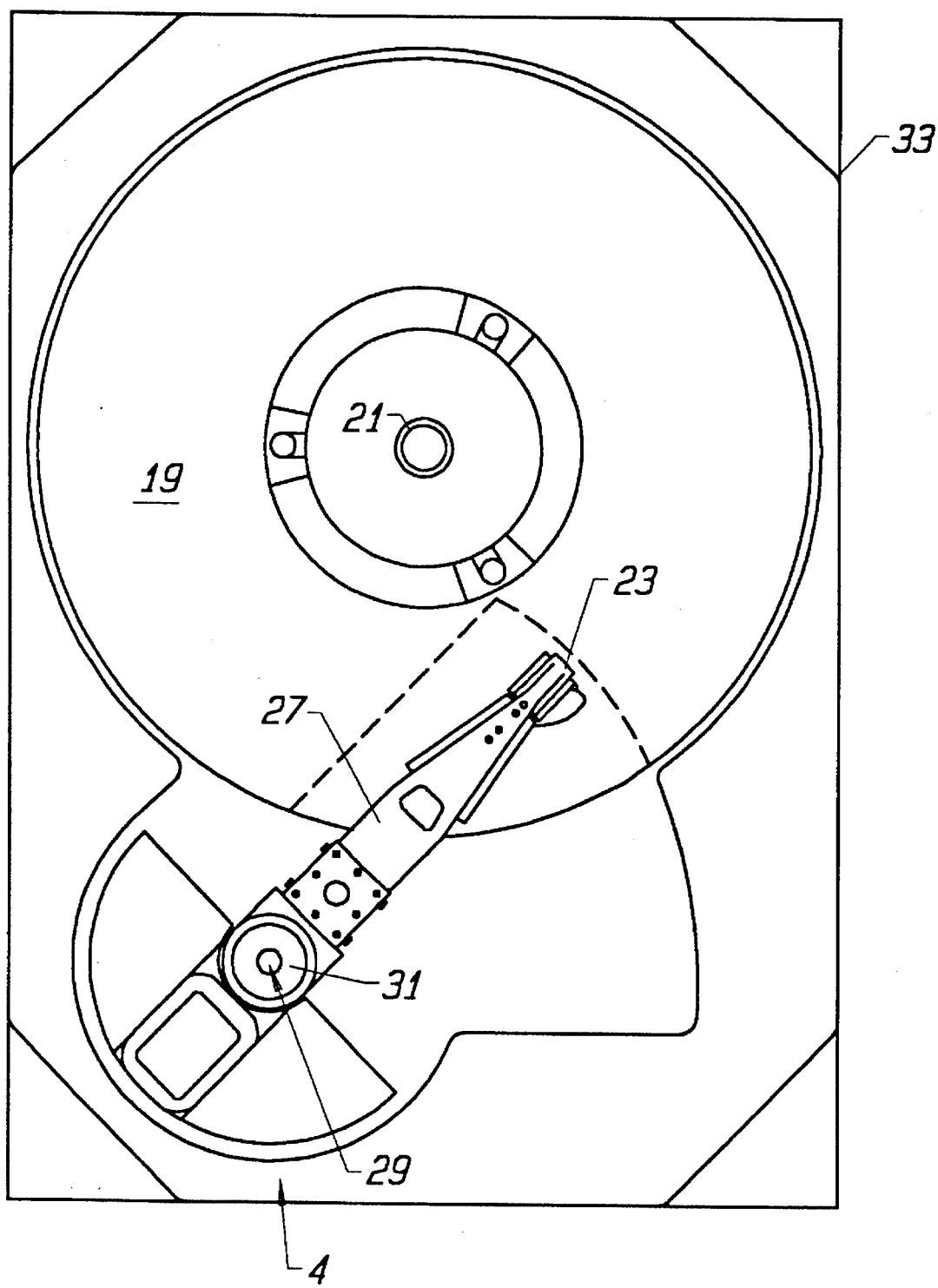
FIG. 2 is a top plan view of a disc drive in which the present invention is useful.

Referring next to FIG. 2, this figure is a top plan view illustrating the basic elements of a disc drive in which this invention is especially useful, including the rotating discs, or disc 19, which are rotated by the spindle of a spindle motor not shown in this figure. As the discs rotate, transducer 23 (mounted on the end of an actuator arm 27) is selectively positioned by a voice call motor 29 rotating above a pivot 31 to move the transducer from track to track over the surface of the disc. All of these elements are mounted in a housing 33 which is typically an air-tight housing to minimize the possibility of contaminants reaching the surface of the disc. Such contaminants could interfere with the reading and writing of data on the surface of the disc by a transducer because the transducer has an extremely fine gap at which reading and writing occurs, and in today's technology flying is extremely close to the surface of the disc. Further, these fine tolerances between adjacent tracks and between the transducer and the surface of the disc have exaggerated the importance of maintaining the stability of the disc while it rotates. Therefore, the ability of the spindle motor to maintain its stiffness and prevent tilting or wobbling of the disc relative to the separately mounted actuator arm and the transducer which it supports is exaggerated.

Many companies are now attempting to design a spindle motor using hydrodynamic bearings because of their many advantages. However, an important problem to be solved is that the viscosity of the fluid or oil to lubricate the bearing will change with temperature. As is apparent from the curves of FIG. 3, as the temperature increases, the stiffness of the bearing decreases. In a hydrodynamic bearing without temperature compensation, this is caused by a significant temperature induced decrease in viscosity which reduces the stiffness of the bearing. Thus the reason for the present invention is to offset changes in the gap with temperature to eliminate or diminish these problems. The objective is to modify the gap or the distribution of fluid within the gap, as shown by the dotted line in FIG. 4, so that the stiffness of the hydrodynamic bearing exposed to changes in temperature is linearized to reduce temperature dependency.

A first approach to the solution appears in FIG. 5. The basic concept of temperature compensation by using a gap defined by two different materials is already known. Thus, a typical shaft or rotating surface 50 would be made of one material and provided with shallow lubricant pumping grooves (which are not shown). The bearing bushing is provided with a lining 52 of a material having a different (typically higher) coefficient of expansion than the shaft 50 and is supported from a containment wall 54 so that the overall system is stable. As the temperature increases, the expansion of the material comprising the bushing or thrust plate 52 will exceed that of the shaft 50, so that the expansion takes place in the direction of the bearing gap, and the bearing gap becomes smaller. According to the present invention, two modifications have been made. First, a shallow recess or expansion space 56 is defined in one of the two surfaces. In this preferred embodiment, the expansion space is in the bushing or thrust plate surface. This expansion space preferably has a dimensions that is about 2.5 microns deep, and for effective gap thickness—5 microns—provides a place for the fluid to be collected during operation at low temperature. This recess is provided both to help maintain the stiffness of the overall system and to account for the fact that with increase in temperature—the reason for providing the materials of different coefficient of expansion—while the effective gap will shrink, the viscosity of the fluid will also decrease. However, the additional fluid will be forced out of the recess and into the gap, maintaining gap stiffness. The provision of this recess, in addition to supporting the stability and stiffness of the overall hydrodynamic bearing, will also provide a fluid storage recess to prevent fluid from being forced out into the surrounding atmosphere. Because the change in volume with temperature is minimal, it is not believed that any fluid will be forced out into the atmosphere as the gap shrinks. It is well known in this technology to provide extra space along the bearing gap to allow for the fact that the fluid column will rise and fall with changes in temperature.

In a preferred embodiment, the use of this recess is further enhanced by providing spiral grooves that are opposite in orientation to the conventional orientation of such grooves in the two regions A of the bushing 52. These grooves are oriented to move fluid out along the surface of the hydrodynamic bearing, thereby maintaining and enhancing the stiffness of the hydrodynamic bearing even as the viscosity falls.

An alternative embodiment is shown in FIG. 6. In this embodiment, the fluid which lubricates the hydrodynamic bearing is again held in the gap between a rotating shaft 50 and a bushing located at 52. However, in this embodiment, the bushing comprises a sequence of materials which form a magnetic circuit, and the fluid is a ferro fluid which is contained by the effects of the magnetic circuit on the gap. In a preferred embodiment, the center region of the bushing 50 comprises a magnet 62. Sandwiching the magnet on either side along the length of the bearing are layers of a material which is a temperature compensated material with permeability that is reduced with an increase in temperature. Thus a material such as Carpenter Temperature Compensation 32 could be used as the layers 64. Adjacent the temperature compensated material is a layer of magnetic steel 66. At low temperatures, the ferro fluid 60 is maintained in the gap throughout the region between the magnetic steel, the temperature compensated steel, and the magnet, and lubricates the entire surface. At elevated temperatures, the permeability of the steel layer 64 is reduced so that it attracts less fluid causing the fluid to migrate toward the regions adjacent the magnetic steel 66. This way, there is more fluid at the outer regions of the hydrodynamic bearing during operation at elevated temperatures so that the stiffness of the bearing is maintained even as the viscosity is reduced.

In a further preferred form of this invention, the recess 56 explained with respect to the embodiment of FIG. 5 is also provided so that there is a sufficient volume of fluid to compensate for the drop in viscosity.

Alternatives to the embodiment of the present application may become apparent to a person of skill in the art who studies the present invention disclosure. Thus the scope of the invention is to be limited only by the following claims.

What is claimed is:

1. A hydrodynamic bearing system, comprising two parts which are rotatable with respect to each other and have bearing surfaces that cooperate with each other and define a gap, at least one bearing surface of each pair of cooperating bearing surfaces, having surface features thereon for moving a fluid into or through said gap, at least one of said relatively rotatable parts being made of materials chosen such that as the temperature rises, the gap between the bearing surfaces becomes smaller due to the different thermal expansions of said first and second parts, and further comprising a recess formed in one of said bearing surfaces near a center region of said bearing providing a volume region for holding said fluid said fluid being forced from said recess and into said bearing gap especially when the temperature of said bearing system is rising to maintain the stiffness of said bearing system.

2. A hydrodynamic bearing system as claimed in claim 1 wherein said two relatively rotatable parts comprise a rotating shaft and a journal and each one has bearing surfaces that cooperate with one another along the axial direction of said bearing.

3. A hydrodynamic bearing system as claimed in claim 2 wherein said surface features comprise lubricant pumping grooves located on said rotating shaft.

4. A hydrodynamic bearing system as claimed in claim 3 herein said recess is located in the non-rotating journal surface.

5. A hydrodynamic bearing system as claimed in claim 4 wherein the regions of said journal adjacent and said recess are grooved.

6. A hyrdodynamic bearing as claimed in claim 1 wherein said two relatively rotatable parts comprise a thrust plate and journal bearing plate and each one has bearing surfaces that cooperate with one another along the axial direction of said bearing.

7. A hydrodynamic bearing system as claimed in claim 6 wherein said surface features comprise lubricant pumping grooves located on said thrust plate.

8. A hydrodynamic bearing system as claimed in claim 7 wherein said recess is located in the non-rotating bearing surface.

9. A hydrodynamic bearing system as claimed in claim 8 wherein the regions of said bearing adjacent and said recess are grooved.

10. A hydrodynamic bearing system comprising two parts which are rotatable with respect to each other and have bearing surfaces that cooperate with one another in the axial direction along said bearing to define a fluid bearing gap, at least one bearing surface of each pair of cooperating bearing surfaces being provided with surface features for moving fluid into said gap, at least one of said respectively rotatable parts being formed of a sequence of materials comprising a magnetic material and temperature compensated magnetically permeable material substantially adjacent to said magnet, the permeability of said temperature compensated magnetic materials being chosen so that as the temperature of said bearing rises, the permeability of said magnetic materials is altered to alter the amount of adjacent bearing ferro fluid, whereby the stiffness of the bearing system is maintained.

11. A hydrodynamic bearing system as claimed in claim 10 wherein the temperature compensated magnetic material is immediately adjacent the magnet, and further axially adjacent said temperature compensated material is a layer of magnetic steel, the magnet and temperature compensated magnetic material and magnetic steel forming a magnetic circuit for distributing the fluid that is lubricating the bearing in the gap.

12. A hydrodynamic bearing system as claimed in claim 11 wherein the permeability of the temperature compensated magnetic material is reduced with increases in temperature to distribute the fluid further from the center of the bearing, maintaining the stiffness of the bearing.

13. A bearing as claimed in claim 12 wherein on at least one of said surfaces of said bearing parts said surface features comprise a pattern of shallow lubricant pumping grooves for further distributing the ferro fluid over the surface of the bearing.

14. A hydrodynamic bearing system as claimed in claim 10 wherein of said two relatively rotatable parts one of said parts is a shaft and the other is a bearing bushing with surfaces that cooperate with one another to distribute ferro fluid over the surface of the bearing during operation.

15. A hydrodynamic bearing system as claimed in claim 14 wherein said bushing has said surface features comprising a plurality of grooves oriented to distribute the fluid away from the center of said bearing.

16. A hydrodynamic bearing system as claimed in claim 15 including a recess inset in one of said surface adjacent said magnet for holding said ferro fluid to provide further fluid to said gap in response to an increase in temperature.

17. A hydrodynamic bearing system as claimed in claim 16 wherein said bushing has said surface features comprising a plurality of grooves oriented to distribute the fluid away from the center of said bearing, said grooves being oriented to distribute fluid away from said recess.

18. A hydrodynamic bearing system as claimed in claim 10 wherein of said two relatively rotatable parts one of said parts is a thrust plate and the other is a bearing bushing with surfaces that cooperate with one another to distribute ferro fluid over the surface of the bearing during operation.

19. A hydrodynamic bearing system as claimed in 18 wherein said bushing has said surface features comprising a plurality of grooves oriented to distribute the fluid away from the center of said bearing.

20. A hydrodynamic bearing system as claimed in claim 19 including a recess inset in one of said surface adjacent said magnet for holding said ferro fluid to provide further fluid to said gap in response to an increase in temperature.

21. A hydrodynamic bearing system as claimed in claim 20 wherein said bushing has said surface features comprising a plurality of grooves oriented to distribute the fluid away from the center of said bearing, said grooves being oriented to distribute fluid away from said recess.

* * * * *